UNITED STATES PATENT OFFICE.

GEORGE HILLARD BENJAMIN, OF NEW YORK, N. Y.

PROCESS OF TREATING SUGAR-BEETS AND THE PRODUCT DERIVED THEREFROM.

1,207,840.     Specification of Letters Patent.     Patented Dec. 12, 1916.

No Drawing.     Application filed December 17, 1914. Serial No. 877,629.

*To all whom it may concern:*

Be it known that I, GEORGE HILLARD BENJAMIN, a citizen of the United States, residing at New York city, in the county and State of New York, have invented a certain new and Improved Process of Treating Sugar-Beets and the Product Derived Therefrom, of which the following is a specification.

My invention relates to a process of treating sugar beets for the production of a product which may be stored for any length of time, and subsequently treated for the extraction of the sugar content.

In the manufacture of beet sugar, the sugar beets after topping, are carried to the factories in the condition in which they are taken from the fields, where they are sliced, or otherwise converted into cossettes and then treated in diffusion batteries for the extraction of the sugar. Owing to the fact that the beets cannot be preserved in the natural condition for any considerable length of time, the period during which beet sugar manufacture may be continued in operation, or otherwise, what is known as the length of the campaign, is very limited. Generally, the campaign does not exceed from three to four months, which means the factories remain idle for from eight to nine months in the year.

The object of my invention is to so treat the beets at the farm, or in the vicinity where they are produced, that the resulting product will be capable of storage for any length of time, and when the product is received at the factory, may be treated as is the case with fresh beets, and thus the campaign continued throughout the whole year. It will be understood that by following my plan as above outlined, and as hereinafter more specifically described, very considerable saving in operation will result, the amount of crystallizable sugar obtained will be increased, and all losses due to frozen beets, etc., will be avoided.

To carry my invention into effect I proceed in the manner which I will now describe.

The beets as taken from the fields, are first topped and then washed in any suitable apparatus for the purpose of removing dirt, stones, etc., after which the beets are divided by means of any suitable machine, into cossettes of the usual size and thickness. It will be understood, for reasons hereinafter set forth, that instead of dividing the beets into cossettes of the usual size and thickness, they may be shredded or otherwise divided into parts smaller than cossettes. After the division of the beets, they are introduced into any suitable dehydrating apparatus, such for instance, as that described in my application for a patent, Serial No. 854,598 filed Aug. 1st, 1914, and therein subjected to the action of large volumes of moving pure dehydrated air. The air is not necessarily dehydrated, although I prefer that it should be, as by so doing the action in the dehydrating apparatus may be entirely independent of the conditions of the atmosphere, so far as relates to moisture, and temperature, external to the apparatus. The temperature of the air and the length of time during which it may be applied, may be varied, as will be shown by the following examples:

Example I: The cossettes are placed in a dehydrater on trays, and therein subjected to moving air currents of 170° Fahrenheit for ninety minutes, this temperature and duration of application of the moving air currents being sufficient to effect the removal of the required amount of the contained water.

Example II: The cossettes are placed in a dehydrater on trays, and therein subjected to moving air currents of 90° Fahrenheit for thirty minutes; then to moving air currents of 140° Fahrenheit for forty minutes; then to moving air currents of 160° Fahrenheit for thirty minutes, these temperatures and durations of application of the moving air currents being sufficient to effect the removal of the required amount of the contained water.

I wish it understood that the temperature and durations of application of the moving air currents may be varied in accordance with the condition of the beets, so far as relates to the percentage of contained water, volume of air currents transmitted, etc. The essential conditions to be observed, however, being, first, to effect the removal of such proportion of the contained water that the balance of the water remaining will be sufficient to maintain the cell walls of the beet cells in a condition to permit subsequent osmosis; and second, to effect coagulation of the albuminous substances, and possibly other bodies forming the colloidal substances, and without producing any inversion or loss of the sugar content of the beet and third, to so regulate the temperature and humidity, as to effect, during the treatment of the cossettes, a conversion of all or a part of the reserve food products carried by the cossettes, into crystallizable sugar.

The following analysis will illustrate the effect of the process above described, and the characteristics of the product obtained:

*Analysis parts in 100.*

|  | Fresh cossettes. | Dehydrated cossette. |
|---|---|---|
| Water | 78.98% | 10.67% |
| Polarization | 14.80% | 65.10% |
| Polarization on dry substances | 70.41% | 72.87% |
| Invert-sugar | None. | None. |

The above analyses were made, that of of the fresh cossettes, by the method of hot aqueous digestion, consisting in subjecting the normal weight (26.0 grams) of material (or a proportionate amount of such normal weight) to the action of 177 cc. basic lead acetate solution (or a proportionate amount of this reagent) which contains 25 cc. of basic lead acetate solution per liter, in a closed beaker or other vessel, to a temperature of 75°–80° C. for thirty minutes, then cooling to 20° C., mixing well, filtering and polarizing the filtrate; that of the dried cossettes by a modified method of hot aqueous digestion, consisting in subjecting the normal weight (26.0 grams) of material (or a proportionate amount of such normal weight) to the action of 184.8 cc. basic lead acetate solution (or a proportionate amount of this reagent) which contains 25 cc. of basic lead acetate solution per liter, in a closed beaker or other vessel, to a temperature of 75°–80° C. for thirty minutes, then cooling to 20° C., mixing well, filtering and polarizing the filtrate. The difference between 177 cc. basic lead acetate solution employed in treating fresh cossettes, and 184.8 cc. basic lead acetate solution employed in treating the dried cossettes, is due to the fact that the "marc" in the dehydrated cossettes has been increased four fold.

The figures above given demonstrate that the water content of the cossettes has been reduced to a point (10.67%) sufficiently low to guard the cossettes against mold and decay; that not only has no sugar been destroyed, but that the polarization, held to represent crystallizable sugar, has been increased by 2.46, i. e., 3.49%, and further, that no invert sugar has been formed. The characteristic features of the dry product as above described, may be stated as follows: First, the dried cossettes will contain more crystallizable sugar than was contained in the fresh cossettes. Second, if the dried cossettes are placed in water having a temperature of approximately 70° Fahrenheit, they will within thirty minutes or less, reabsorb by endosmosis, the water taken from them by the dehydration process, and be restored to their original appearance, thereby showing that the cell membranes have not been injured by the dehydration treatment.

My improved process and product results in the following important advantages:

(1) Owing to the fact that the colloidal substances in the divided beets, at least those of an albuminous nature, are changed in character, they will not, or at least not readily, pass through the cell membranes of the beet in diffusion, and a purer sugar solution is obtained.

(2) Owing to the fact that the divided beets contain about four times as much sugar per unit of weight, than is the case with fresh cossettes, a very much more concentrated sugar solution is obtained by diffusion.

(3) Owing to the fact that the sugar solution has greater density, very much less water must be removed from the said solution in the subsequent concentration, i. e., in the multiple effect. This means: (a) A very considerable saving in fuel (steam). (b) A very material saving in time. (c) A very materially decreased danger of loss of sugar by inversion.

(4) Owing to the fact that a purer juice is obtained by the process, the saccharate of lime which is formed as the next step in the manufacture of sugar from the juice, is of a superior quality, and will, on carbonatation, yield a purer carbonate of lime; and in the case where a very pure sugar solution is obtained, i. e., a sugar solution free from colloidal substances, the carbonatation process may be entirely eliminated.

(5) Owing to the fact that the colloidal matter, or at least the albuminous part thereof, is retained in the divided product, in the process of diffusion, the value of the divided product as a cattle food, is materially increased.

(6) Owing to the fact that in the process, sufficient water is removed from the divided product to prevent molding, decay and the loss of sugar by inversion, the dry product can be stored for a long time, and thus the beet sugar factories may remain in operation for a much longer period each year than is now possible.

(7) Owing to the fact that the treatment, i. e., the slicing and dehydration of the beets can be achieved by the installation of simple and relatively inexpensive apparatus in the fields where the beets are grown, and the fact that four tons of fresh products yield one ton of dehydrated product, the transportation charges of the raw material to the factories from the field, will be reduced to at least one quarter of the present cost.

(8) Owing to the fact that the enzym present in the cossettes is rendered active by the treatment, all or a part of the reserve food products, i. e., starch, etc., are converted into crystallizable sugar, thus increasing the sugar yield.

In this specification, I have described the dried product, i. e., the dried cossettes, as capable of storage for any length of time without deterioration, and this is true, provided the dried product is protected against the absorption, by the product, of such an amount of water as is necessary to combine with the enzym or bacteria present in the product, to set up fermentation or produce mold. Many means may be used for this purpose, as for instance, storing the cossettes packed in bales in rooms where the percentage of moisture carried by the atmosphere is maintained constant; packing the dried product in bales and protecting them by an impervious coating, as for instance oiled paper; means also may be used to neutralize any acid reaction which may be noticed, as for instance, by the mixing with the beets of calcium phosphate soluble in weak acid, or by sulfuring, care being taken to prevent using sufficient sulfur to bring about inversion of the sugar juice in the subsequent process of diffusion; treatment with formaldehyde and similar bodies may also be employed.

In this specification I have described the beets as divided into cossettes, shredded or otherwise separated into small parts or particles. It will be understood that the usual practice in dividing beets into cossettes is for the purpose of bringing the beets into the best condition to be treated by the diffusion process, while at the same time mechanically destroying as few of the cell walls of the beets as possible; the object of the diffusion process being to extract the crystallizable sugar and leave the colloidal substances within the cell structure.

In my process as above described, it is not so important to divide the beets into cossettes, and for the reason that the temperatures to which the divided beets are subjected in the dehydrating apparatus, effect a coagulation of the albuminous and possibly other parts of the colloidal body, which may be readily separated from the crystallizable body by filtration or other known method.

It is the intent of my invention to divide the beets into as small particles as possible, and thus obtain rapid extraction of the sugar, without introducing into the sugar juices any considerable amount of colloidal substances which require separate processes for separation.

In the practice of my invention, I have found that where the beets are properly divided and dehydrated, the contained sugar may be extracted very much more rapidly and perfectly than is the case with the present system of extraction using fresh beets— which fact is probably due, (first) to the concentration of the sugar in the dried product, and (second) to the separation of the crystallizable and colloidal substances, thereby facilitating exosmosis of the crystallizable sugar through the cell membranes.

Having thus described my invention, I claim:

1. The process of treating sugar beets, which consists in first dividing the beets, then subjecting the divided beets to the action of moving air currents having a temperature sufficient to gradually extract the required percentage of water and to coagulate all coagulable materials, but insufficient to destroy the enzyms present or rupture the cell walls or render such walls incapable of permitting osmosis when the dried product is subsequently treated in the diffusion process.

2. The process of treating sugar beets, which consists in first dividing the beets, then subjecting the divided beets to the action of moving air currents of large volume heated to a temperature sufficient to gradually extract approximately 90% of the normally contained water and to coagulate all coagulable materials, but insufficient to sterilize the cossettes or rupture the cell walls or render such walls incapable of permitting osmosis when the dried product is subsequently treated in the diffusion process.

3. The process of treating sugar beets, which consists in first dividing the beets, then subjecting the divided beets to the action of moving air currents having a temperature of approximately 170° Fahrenheit and continued sufficiently long to gradually extract approximately 90% of the normally contained water and to coagulate all coagulable materials and not to rupture the cell walls or render such walls incapable of permitting osmosis when the dried product is subsequently treated in the diffusion process.

4. The process of treating sugar beets, which consists in first dividing the beets, then subjecting the divided beets to the action of moving air currents of large volume heated to a temperature to gradually extract 90% of the contained water and to coagulate the coagulable materials, but insufficient to rupture the cell walls of the beets or destroy the enzyms present, and finally incorporating with the dried product, a material which will prevent fermentation or mold taking place in such dried product.

5. The process of treating sugar beets which consists in first dividing the beets, then extracting the required percentage of water, and simultaneously coagulating all coagulable materials contained in the beets and without destroying the enzyms present or rupturing the cell walls or rendering such walls incapable of permitting osmosis when the dried product is subsequently treated in the diffusion process.

6. The method of increasing the crystallizable sugar in sugar bearing bodies of plant growth, which consists in subjecting the body to the action of a temperature of given range, i. e., between 90 and 160° Fahrenheit, and in the presence of sufficient moisture to develop the action of the enzyms present in the body, and thereby convert all or a part of the reserve food products into sucrose.

7. As a new product, divided, dried sugar beets, characterized by having the normal enzyms in an active condition, all of the coagulable substance carried by the beets in a coagulated condition, containing all the sugar constituents unaltered found in the beets in their fresh state, and said divided dried sugar beets capable of endosmotically absorbing approximately all of their originally contained water when subsequently placed in warm water.

8. As a new product, divided, dried sugar beets, characterized by having the normal enzyms in an active condition, their cell membranes in a state which will freely permit, when immersed in warm water, an exosmotic movement of the crystallizable substances (sugar) through the cell membranes, but retard or prevent the movement through such cell membranes of the colloidal or coagulated substances forming a part of the colloidal bodies.

9. As a new product, divided, dried sugar beets, having all the normal enzyms in an active condition, their crystallizable substances in their original conditions, and the coagulable bodies forming a part of the colloidal substances in a coagulated condition, and the cell membranes in a condition to permit osmosis when the divided dried body is placed in warm water.

10. As a new product, divided dried sugar beets containing more crystallizable sugar than was originally contained in the fresh beets before treatment.

11. The process of treating sugar beets to increase the crystallizable sugar constituent thereof, which consists in first dividing the beets, then subjecting the divided beets to the action of moving air currents having the required temperature and humidity to cause the enzym present in the beet to act upon and convert all or a part of the reserve food products, such as starch, etc., present in the beet, into crystallizable sugar.

In testimony whereof, I affix my signature, in the presence of two witnesses.

GEORGE HILLARD BENJAMIN.

Witnesses:
 HELEN E. KOELSCH,
 FRED R. WALTER.